Patented Dec. 12, 1950

2,533,989

UNITED STATES PATENT OFFICE 2,533,989

ANTIOXIDANTS FOR GREASES AND SIMILAR MATERIALS

Alan Beerbower, Baltimore, Md., and John C. Zimmer, Union, N. J., assignors to Standard Oil Development Company, a corporation of Delaware No Drawing. Application August 30, 1947, Serial No. 771,562

7 Claims. (Cl. 252—40)

The present invention relates to antioxidants for greases and the like and is particularly concerned with the protection of lubricating greases and related materials from rapid deterioration due to oxidation.

It is an object of the present invention to improve the quality and oxidation resistant properties of lubricating greases by incorporating therein combined materials which are more effective in combination than either material alone for the purpose of inhibiting oxidation of the grease and preventing corrosion of metal parts. A further object is to combine a resinous polymer product, having mild inhibiting properties, with a known oxidation inhibitor, to augment the effectiveness of the latter and also to cause said known inhibitor to exert a synergistic effect and thereby improve lubrication, particularly of antifriction bearings and the like.

Other and related objects will become apparent as the description proceeds.

In United States patent to Mikeska et al. No. 2,348,638, there is disclosed an alkyl phenol formaldehyde condensation product which is described as being useful in preventing discoloration of motor fuel and in rendering such fuel inert to metals which otherwise commonly react therewith to make the fuel cloudy or to form precipitates therein. As described in said patent, such compounds may be formed by condensing an alkyl phenol, such as para-isooctyl-phenol, with formaldehyde, in the presence of a hydrogen-halide acid such as strong hydrochloric acid. The resulting phenolic condensation product is thereafter reacted with a nitrogen base material such as ammonia, an amine compound, or with other related bases which may include phosphorus, ammonia being preferred. As indicated in said patent, it is desirable to have an oil soluble compound, and oil solubility increases with the length of the alkyl substituent in the phenol nucleus.

In the first stage of the process, the alkyl phenol may be regarded as condensing with the reaction product of the hydrogen halide and aldehyde, or with formaldehyde to produce a hydroxy alkyl benzyl chloride, or chlormethyl alkyl phenol having the general formula

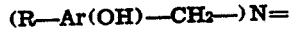

where R represents one or more alkyl substituents in the aromatic nucleus Ar. In the second stage of the reaction, this product splits off the halogen, e. g. chlorine, in undergoing a further condensation with the organic base, e. g. ammonia. Thus the alkyl phenol radical becomes united with the base radical through the —CH₂— group, forming compounds which contain the characteristic group $$(R—Ar(OH)—CH_2—)N=$$

The nitrogen atom N may attach to hydrogen or various alkyl, aryl or cyclo-alkyl groups, etc., as further described in said Mikeska et al. patent.

As further described in said patent, the preferred substances are ammonium derivatives of a phenol-formaldehyde-hydrogen chloride condensation product, wherein the phenol groups contain alkyl or aliphatic substituents containing from 4 to about 12 carbon atoms. The alkyl phenols having isoalkyl substituents are especially preferred. Thus a preferred compound may be aptly described as a resinous compound containing a nitrogen base radical through a methylene group, wherein the alkyl group of said alkyl phenol has from 4 to 12 carbon atoms and is preferably an isoalkyl group. This group may desirably be an iso-octyl group, or a polyisobutyl group. It may have the general compositional formula

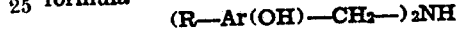

or

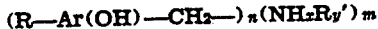

where R represents one or more alkyl substituents, containing preferably 4 to 12 carbon atoms, Ar is a substituted benzene nucleus holding an OH group, and the methylene group —CH₂— links the nucleus to the nitrogen of an amino group. In the latter formula R' represents an alkyl group and the subscripts $x$, $y$, $m$ and $n$ are integers having appropriate values as described in said Mikeska et al. patent. From the formulas listed above, there may be directly derived the more general formula

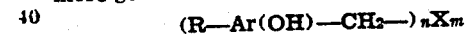

where X represents a base radical such as the various nitrogen base radicals and phosphorus base radicals described in detail in said patent and indicated in the foregoing formula. In this formula, Ar represents a benzene nucleus, $n$ is an integer of 1 to 3, as indicated in said Mikeska patent, and $m$ is a small integer, usually 1 but may be 2 or more. Where $m$ is 1 and $n$ is 1, the formula becomes

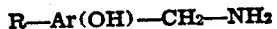

Where $n$ is 2, the formula becomes

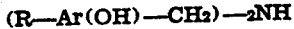

etc.

The condensation product described above has certain known corrosion inhibiting properties, as indicated in said Mikeska patent. We have discovered, however, that when a small quantity of such product is added to lubricating greases, in combination with phenyl-alpha-naphthylamine, a well-known oxidation inhibitor, the effect on the lubricant is not merely cumulative, but is of an unexpected kind and quality.

Thus a small quantity of the resinous polymer, which may be described as an ammonium or related derivative of an alkyl phenol-formaldehyde-hydrogen chloride condensation product, may be added, in combination with a quantity of the same general order of phenyl-alpha-naphthylamine, to conventional soda, lime and other base greases, with the result that the oxidation-resisting life of such grease is increased to a much greater extent than would be expected from a consideration of the separate characteristics of the additives.

Specifically, the results of using di-isobutyl phenol methyl amine, a condensation product of di-isobutyl-phenol, formaldehyde and ammonia, produced by the process mentioned hereinabove, in combination with phenyl-alpha-naphthylamine, are indicated below. These materials were tested in a standard ball bearing grease containing approximately 17% sodium soap and 5% calcium soap of mixed hydrogenated fish oil glycerides and acids. Comparable tests were made of the same grease with no inhibitor, and with phenyl-alpha-naphthylamine alone as the inhibitor. The greases were subjected to the standard Norma-Hoffmann bomb oxidation test, the grease being subjected to and held under an oxygen pressure of 110 p. s. i. at 210° F. The loss in pressure was noted every two hours.

*Example I*

| Antioxidants | Hrs. for 5 p. s. i. drop | Hrs., 10 p. s. i. drop |
|---|---|---|
| None | 18 | 20 |
| 1% Phenyl-alpha-naphthylamine | 26 | 64 |
| 1% Phenyl-alpha-naphthylamine plus 0.5% di-isobuytl phenol methyl amine as above | 68 | 160 |

*Example II*

Another grease containing 22% sodium soap and no calcium soap, gave the following results:

| Antioxidants | Hrs. for 5 p. s. i. drop | Hrs., 10 p. s. i. drop |
|---|---|---|
| None | 18 | 20 |
| 0.5% Phenyl-alpha-naphthylamine | 64 | 66 |
| 0.5% Phenyl-alpha-naphthylamine plus 0.5% di-isobutyl phenol methyl amine as above | 132 | 188 |

Percentages given above are by weight. It will be noted that in both cases, the use of 0.5% of the resin, in addition to the phenyl alpha naphthylamine, more than doubled and in some cases nearly tripled the oxidation-resisting life of the lubricant. The resinous polymer or condensation product has good anti-oxidation properties by itself and may be used alone, but its use in combination with another standard antioxidant appears to be preferable.

The foregoing examples illustrate the superiority of a mixture of the two antioxidants over phenyl-alpha-naphylamine alone. The latter has been considered a highly satisfactory oxidation inhibitor in the past. Additional data have been obtained to demonstrate the comparison between a mixture of the two inhibitors and the condensation product by itself. The results of the standard Norma-Hoffmann bomb tests at 210° F. with the catalyst on inhibited and uninhibited sodium-calcium ball bearing grease are shown in Example III.

*Example III*

| Phenyl-alpha-naphthyl-amine | Di-iso-butyl phenol methyla-mine | Hours for Pressure Drop Shown | | | |
|---|---|---|---|---|---|
| | | 5 p. s. i. | 10 p. s. i. | 15 p. s. i. | 20 p. s. i. |
| Percent | Percent | | | | |
| 0 | 0 | 36 | 38 | 40 | 42 |
| 1 | 0 | 184 | 302 | 346 | -------- |
| 0 | 1 | 292 | 344 | 348 | -------- |
| ½ | ½ | 348 | 490 | 512 | 516 |

The grease used in this example was a sodium soap and calcium soap grease of the same composition as described above in connection with Example I. Similar tests were conducted on sodium-barium greases, the barium soap replacing calcium soap, with very similar results. The inhibitor di-isobutyl phenol methyl amine referred to above is a preferred type of condensation product but it will be understood that other derivatives of the same general class may be substituted therefor as indicated above.

While we have described the use of the resinous polymer and phenyl-alpha-naphthylamine in greases of the sodium and calcium type, it will be understood that these materials may be used in greases of various bases and mixtures thereof. In general, the combined modifiers may be used in any grease, oil, or related product, where phenyl-alpha-naphthylamine is in conventional use or where oxidation and/or corrosion inhibitors are needed. Furthermore, use is not necessarily limited to greases, although, because of their synergistic effect on soap base greases, this is a preferred use. It will be understood that the invention is not limited to the proportions given in the above specific examples, although quantities of not more than 1% of each of resin and phenyl-alpha-naphthylamine commonly are preferred in greases. The quantities of each of these materials may vary from as little as 0.01% to 3%, based on the weight of the grease or other material being treated.

It will also be understood that the combined inhibiting ingredients are by themselves a new and useful composition which may be prepared and marketed for use in various quantities for adding to various oils, greases, fuels, plastics, etc., as may be desired. Such composition preferably consists essentially of 50 to 100 parts by weight of phenyl-alpha-naphthylamine combined with 50 to 100 parts of the resinous condensation product. As indicated above, however, the composition range may be varied more widely and may consist essentially of 1 to 300 parts of phenyl-alpha-naphthylamine combined with 1 to 300 parts of the resinous product which is preferably a di-isobutyl phenol methyl amine but may be any of the related compounds covered by the general formulas recited hereinabove.

Various conventional additives such as extreme pressure agents, rust or corrosion inhibitors and the like may be added as will be obvious to those skilled in the art.

We claim:

1. A lubricating grease composition consisting essentially of mineral oil and soap to which is added 0.5 to 3% of phenyl-alpha-naphthylamine, and 0.5 to 3% of a resinous composition having the general compositional formula:

$$(R-Ar(OH)-CH_2-)_nX$$

where R is an alkyl radical having 4 to 12 carbon atoms, Ar is a benzene nucleus, X is a nitrogen base radical in which the nitrogen is linked to the aromatic nucleus through the —CH$_2$— group, and $n$ is an integer of 1 to 3.

2. A lubricating grease composition consisting essentially of mineral oil and soap to which is added 0.5 to 3% of phenyl-alpha-naphthylamine and 0.5 to 3% of a resinous composition having the general compositional formula:

$$(R-Ar(OH)-CH_2-)_2NH_2$$

wherein R represents an alkyl radical having 4 to 12 carbon atoms and Ar is a benzene nucleus.

3. A composition as defined in claim 1 wherein R is a disisobutyl group.

4. A composition as defined in claim 2 wherein R represents a diisobutyl group.

5. A lubricating grease composition consisting essentially of mineral lubricating oil thickened to grease consistency with sodium and calcium soaps, said grease being inhibited against oxidation by the addition of 0.5 to 1% by weight of phenyl-alpha-naphthylamine in combination with 0.5 to 1% of a polymeric resinous di-isobutyl phenol methyl amine, based on the total grease composition.

6. A lubricating grease composition consisting essentially of mineral oil containing 17% by weight of sodium soap, 5% of calcium soap, 0.5 to 1% of phenyl-alpha-naphthylamine, and 0.5 to 1% of a polymeric resinous di-isobutyl phenol methyl amine.

7. A lubricating grease composition consisting essentially of mineral oil, 17% by weight of sodium soap, 5% of barium soap, 0.5 to 1% phenyl-alpha-naphthylamine, and 0.5 to 1% of a polymeric resinous di-isobutyl phenol methyl amine.

ALAN BEERBOWER.
JOHN C. ZIMMER.

REFERENCES CITED

The following references are of record in the file of this patent:

UNITED STATES PATENTS

| Number | Name | Date |
| --- | --- | --- |
| 2,255,597 | Downing et al. | Sept. 9, 1941 |
| 2,332,825 | Zimmer et al. | Oct. 26, 1943 |
| 2,348,638 | Mikeska et al. | May 9, 1944 |
| 2,360,631 | Zimmer et al. | Oct. 17, 1944 |
| 2,364,502 | Zimmer et al. | Dec. 5, 1944 |
| 2,369,705 | Woodward et al. | Feb. 20, 1945 |
| 2,401,957 | Pedersen et al. | June 11, 1946 |